(No Model.) 2 Sheets—Sheet 1.

G. W. JOHNSON.
ODOMETER.

No. 396,210. Patented Jan. 15, 1889.

WITNESSES:
C. L. Bendixen
N. M. Seamans

INVENTOR
George W. Johnson
BY
Duell, Laass & Duell
ATTORNEYS (No Model.) 2 Sheets—Sheet 2.
G. W. JOHNSON.
ODOMETER.
No. 396,210. Patented Jan. 15, 1889.
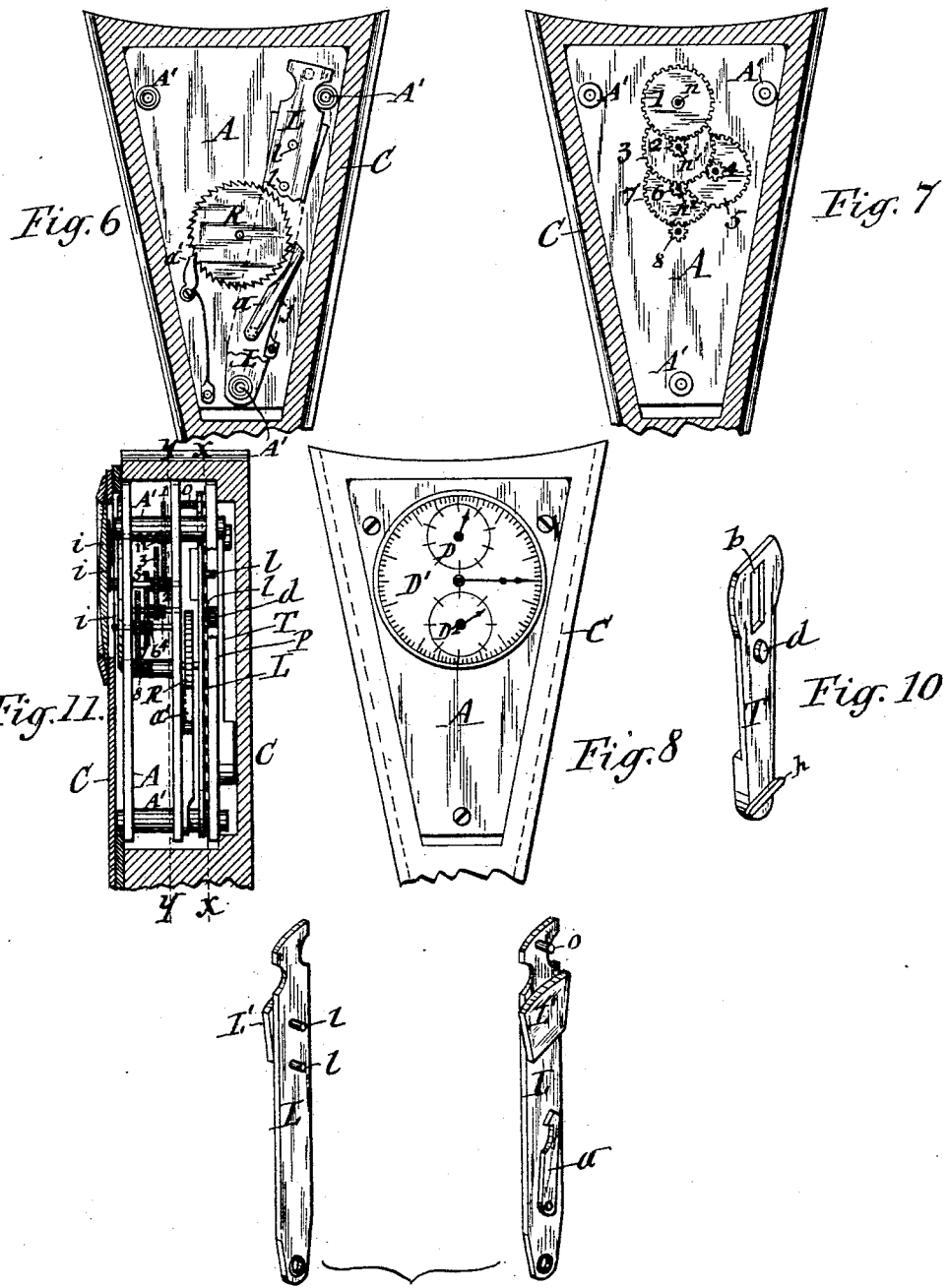

UNITED STATES PATENT OFFICE.

GEORGE W. JOHNSON, OF GENEVA, NEW YORK.

ODOMETER.

SPECIFICATION forming part of Letters Patent No. 396,210, dated January 15, 1889.

Application filed August 18, 1888. Serial No. 283,126. (No model.)

*To all whom it may concern:*

Be it known that I, GEORGE W. JOHNSON, of Geneva, in the county of Ontario, in the State of New York, have invented new and useful Improvements in Odometers, of which the following, taken in connection with the accompanying drawings, is a full, clear, and exact description.

The object of this invention is to provide an odometer which shall be capable of registering the distance traveled in either direction by the wheel to which it is attached, and shall therefore be adapted to be attached to either side of a wheel of a bicycle or to the wheel at either side of a carriage, cart, or other vehicle having wheels on opposite ends of the axle; and to that end my invention consists, essentially, in the combination, with the vehicle-wheel, registering mechanism, and the supporting-frame of the latter secured to said wheel, of a ratchet-wheel secured to one of the shafts of the registering mechanism, a gravitating lever pivoted at one end to said frame, a pawl on said lever engaging the ratchet-wheel, and a gravitating tumbler provided with a suitable catch adapted to alternately engage and release the aforesaid lever during the revolution of the vehicle-wheel, all as hereinafter more fully described, and specifically set forth in the claims.

Figure 1:
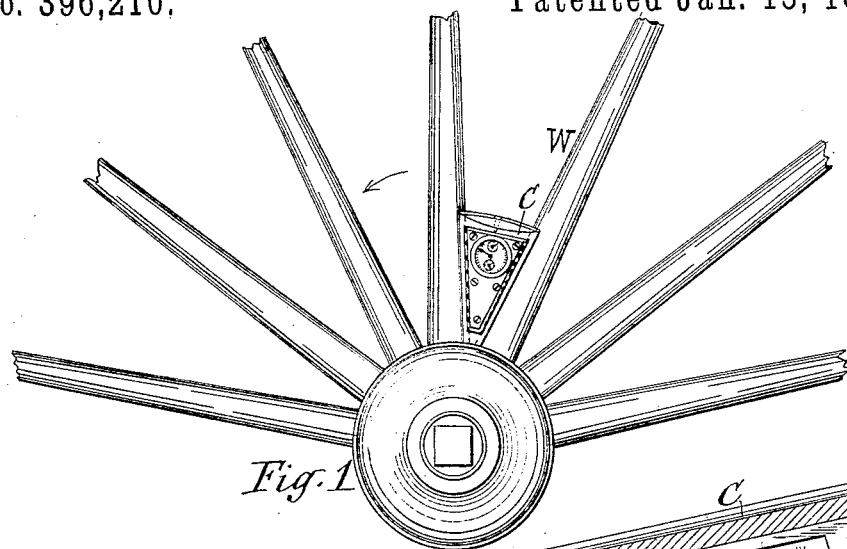
Figure 2:
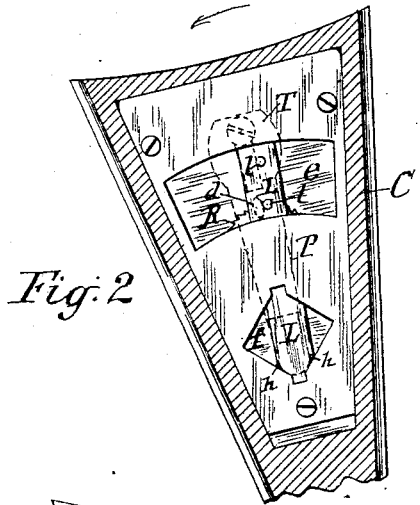
Figure 5:
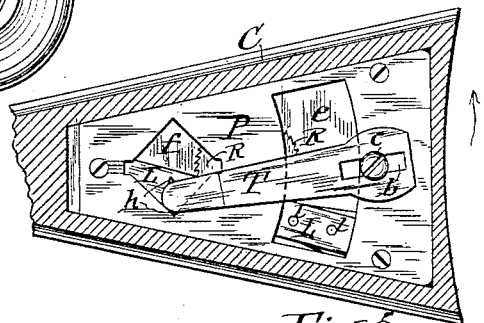
Figure 3:
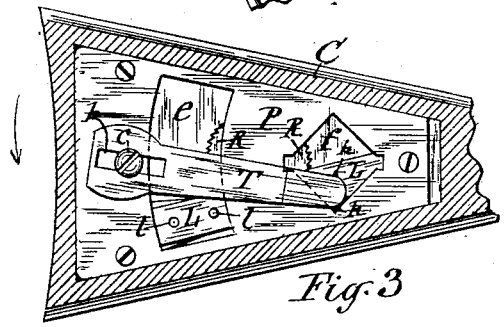
Figure 4:
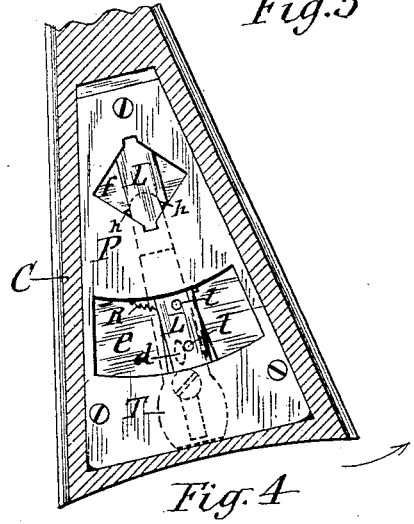

In the annexed drawings, Figure 1 is a side view of that portion of the wheel to which my improved odometer is connected. Figs. 2, 3, 4, and 5 are enlarged detached rear face views of the odometer, showing its operation during the revolution of the wheel, the rear portion of the inclosing-case of the odometer being cut away to illustrate the mechanism of the odometer and the tumbler being represented by dotted lines in Figs. 2 and 4. Fig. 6 is a sectional view taken in a plane along the line *x x*, Fig. 11, a portion of the lever being broken away to illustrate the operation of the pawl connected with said lever and engaging the ratchet-wheel. Fig. 7 is a transverse section on line *y y*, Fig. 11. Fig. 8 is a front view of the odometer minus the face-plate of the inclosing-case. Fig. 9 shows perspective views of opposite sides of the lever which transmits motion to the registering mechanism. Fig. 10 is a perspective view of the tumbler which controls the movement of said lever; and Fig. 11 is a side view of the odometer mechanism and its supporting-frame, with the inclosing-case shown in section.

Similar letters of reference indicate corresponding parts.

A represents the supporting-frame of the registering mechanism, said frame consisting of plates A A and P, of steel or other suitable metal, arranged parallel, one back of the other, and secured to each other by intervening posts A', which sustain said plates suitable distances apart to receive the aforesaid mechanism between them. This frame is set into an inclosing-case, C, which is to be firmly secured in any suitable and well-known manner in a suitable position on the wheel W.

Between the plates A A is arranged the train of gearing 1, 2, 3, 4, 5, 6, 7, and 8, as shown in Figs. 7 and 11 of the drawings. The spindles *n*, *n'*, and *n''* of said gearing project through the front plate A, and have secured to their protruding ends suitable pointers or indicators, *i i i*, which are surrounded by dials D D' D'', graduated to represent miles and fractions of a mile. The spindle of the pinion 8 projects through the back plate A, and has secured to its end a ratchet-wheel, R. To one end of said plate is pivoted a lever, L, the free end of which is extended across the ratchet-wheel and supported on the plate A by a pin, *o*, or other suitable projection on the lever. Said end of the lever is weighted, as indicated at L', to cause the lever to operate by gravity. To the lever, near the pivoted end thereof, is pivoted a pawl, *a*, which is held in engagement with the ratchet-wheel by a spring, *j*, secured at one end to the plate A, and bearing with the opposite end on the pawl.

A spring-actuated dog, *a'*, engages the ratchet-wheel, to prevent retrograde movement, in the usual manner. From the back of the free end of the lever L project two pins, *l l*, or other suitable catches, which are disposed at different points in the length of the lever. The plate P, back of the lever L, is provided with a transversely-elongated aperture, *e*, into which the pins *l l* project and are thus allowed free movement. The aforesaid plate is also provided with a quadrilateral aperture, $f$, which is arranged diagonally in relation to the lever L. To the back of the plate P is pivotally connected a tumbler, T, by means of a screw, $c$, or pin passing through a longitudinal slot, $b$, in the tumbler and secured to the plate P, said slot allowing the tumbler to slide longitudinally. The free end of the tumbler is provided with a guide, $h$, which projects into the aperture $f$ of the plate P, and from the tumbler into the aperture $e$ projects a lug, $d$, which is arranged in such a position as to cause it to fall on the side of and engage one pin $l$ when the tumbler is at one end of its longitudinal movement and engage the other pin $l$ when the tumbler is at the other end of its said movement.

The operation of my improved odometer is as follows: Assuming the odometer to be in the position shown in Fig. 1 of the drawings, the tumbler T has dropped into the position indicated by dotted lines in Fig. 2 of the drawings. When the wheel is set in motion in the direction of the arrow and the odometer has passed a perpendicular line through the axis of the wheel, the free end of the lever L falls by gravity part way forward and is arrested about midway by the collision of the pin $l$ nearest the pivoted end of the lever with the lug $d$ of the tumbler, which latter is at that time held longitudinally central of the frame A by the free end of said tumbler resting with its guide $h$ in the corner of the aperture $f$ toward the hub of the wheel, as indicated by dotted lines in Fig. 2 of the drawings, the odometer coming next into the position illustrated in Fig. 3 of the drawings; and when in this position the weighted free end of the tumbler T is caused to slide down on the inclined edge of the aperture $f$, and is thereby crowded forward so as to carry the lug $d$ out of engagement with the aforesaid pin $l$ and part way toward the other pin $l$, the lever L being thereby released from the tumbler and allowed to farther drop with its free end to one side of the frame A. During the aforesaid two movements of the lever L the pawl $a$, engaging the ratchet-wheel R, imparts a partial rotation to said wheel. As the odometer is carried past a vertical line beneath the axis of the wheel R, the tumbler T slides by gravity in a direction toward the periphery of the wheel, and thereby brings the lug $d$ in position to be encountered by the pin $l$ nearest the free end of the lever L as the latter drops by gravity into the position shown in Fig. 4 of the drawings. During this movement the pawl $a$ slides freely over the ratchet-wheel preparatory to obtaining a new hold thereon. In these positions the aforesaid parts remain until the odometer is carried into the position shown in Fig. 5 of the drawings, wherein the tumbler T is caused to slide toward the hub of the wheel by gravity of the tumbler and by the inclination of the edge of the aperture $f$, on which the free end of the tumbler rests with its guide $h$. The lug $d$ is thereby again thrown out of engagement with the aforesaid pin $l$, and the lever L is allowed to drop and complete its movement for bringing the pawl $a$ into its requisite position to obtain the new hold on the ratchet-wheel R.

It is immaterial in which direction the wheel W turns. The lever becomes intermittently interlocked with the tumbler during the revolution of the wheel, and is released when in such positions as to cause the lever to be actuated by gravity to impart motion to the ratchet-wheel R by means of the pawl $a$.

Having described my invention, what I claim as new, and desire to secure by Letters Patent, is—

1. In combination with the vehicle-wheel, registering mechanism, and the supporting-frame of the latter secured to said wheel, a ratchet-wheel secured to one of the shafts of the registering mechanism, a gravitating lever pivoted at one end to said frame, a pawl on said lever engaging the ratchet-wheel, and a gravitating tumbler provided with catches adapted to alternately engage and release the aforesaid lever during the revolution of the vehicle-wheel, as set forth.

2. In combination with the vehicle-wheel, registering mechanism, and the supporting-frame of the latter secured to said wheel, the ratchet-wheel R, secured to one of the shafts of the registering mechanism, the lever L, pivoted at one end to the aforesaid frame and weighted at the opposite end, the pawl $a$, connected to the lever, and the gravitating tumbler T, arranged movable laterally and longitudinally and provided with catches adapted to alternately engage and release the lever L during the revolution of the vehicle-wheel, as specified.

3. In combination with the wheel W, frame A, and registering mechanism connected to said frame, the ratchet-wheel R, secured to one of the shafts of the registering mechanism, the lever L, pivoted at one end to the frame A at a point between the ratchet-wheel and hub of the wheel and having its free end extending across the ratchet-wheel and weighted, the pawl $a$, connected to said lever, pins $l\,l$, projecting from the lever L, the gravitating tumbler T, provided with the longitudinal slot $b$, and connected oscillatory and movably longitudinally to the frame by the screw $c$ in the said slot, and the lug $d$, projecting from the tumbler and adapted to alternately engage and release the pins $l\,l$ during the movement of the tumbler, substantially as described and shown.

4. In combination with the frame A and registering mechanism connected thereto, the ratchet-wheel R, secured to one of the shafts of said mechanism, the gravitating lever L, pivoted at one end to the frame A and having its free end extending across the ratchet-wheel, the pawl $a$, connected to said lever, the plate P, secured to the frame over the ratchet-wheel and lever and provided with the elongated aperture e and the quadrilateral aperture f, which latter is arranged diagonally in relation to the lever L, the tumbler T, provided with the longitudinal slot b and connected oscillatory and movably longitudinally to the plate P by the screw c, passing through the said slot, the lug d, projecting from the tumbler into the aperture e, the pins l l, projecting from the lever into the said aperture, and the guide h, projecting from the tumbler into aperture f, substantially as described and shown.

In testimony whereof I have hereunto signed my name, in the presence of two witnesses, at Geneva, in the county of Ontario, in the State of New York, this 9th day of August, 1888.

GEORGE W. JOHNSON. [L. S.]

Witnesses:
FRED MCMASTER,
WILLIE MENSCH.